Jan. 30, 1962  C. BARASSI  3,018,810
PNEUMATIC TIRE WITH SEPARATE TREAD RINGS
Filed Oct. 19, 1959

INVENTOR
Carlo Barassi

BY Stevens, Davis, Miller & Mosher
ATTORNEYS

United States Patent Office 3,018,810
Patented Jan. 30, 1962

3,018,810
PNEUMATIC TIRE WITH SEPARATE
TREAD RINGS
Carlo Barassi, Milan, Italy, assignor to Pirelli S.p.A.,
Milan, Italy
Filed Oct. 19, 1959, Ser. No. 847,237
Claims priority, application Italy Feb. 25, 1959
8 Claims. (Cl. 152—176)

The present invention relates to a vehicle tire of the pneumatic type wherein the tread portion is removable from the carcass. More particularly, this invention relates to a tire of the above type wherein the removable tread portion is constituted by a plurality of separate tread rings. This application is a continuation-in-part of my prior co-pending application, Serial No. 739,918, filed on June 4, 1958, now abandoned.

Briefly stated, the invention of my prior application consists in a combination of a substantially radial carcass including a conventional breaker structure and a plurality of substantially inextensible tread rings which are received in suitable annular grooves in the peripheral portion of the casing.

More particularly, the carcass or carrying casing of the type referred to above, has a substantially radial disposition, that is, the cords of the carcass form an angle of about 0 degrees (at any event not exceeding 10°) with respect to any plane passing through the axis of rotation of the tire. Also, the carcass includes a conventional breaker structure, that is, one composed of sheer cords crossed and inclined with respect to the mid-circumferential plane of the tire at an angle varying from 35° to 60°.

The separate tread rings are provided with resistance elements consisting of cords having low elongation properties and made of artificial or synthetic textile material or of metallic material. The cords have a longitudinal or prevailing longitudinal path; that is, they form angles of from about 0° to less than about 20° with respect to the mid-circumferential plane of the tire. The resistance elements are situated on the inner part of the rings, namely, in the part in contact with the carrying casing. The carcass or carrying casing is provided with suitable grooves or seats in which the tire rings are suitably received.

The present invention relates to a specific improvement over the arrangement described above so as to improve the encasing of the rings in their seats on the carcass so as to eliminate possible relative movement between the tread and the carcass even when the vehicle is running on a curve.

More exactly, the specific improvement of the present invention relates to the disposition of the lateral or endmost seats or grooves and is characterized in that the bottom surfaces of the lateral seats are constituted by conical surfaces having their axes coincident with the axis of rotation of the tire and whose diameters increase towards the side walls of the tire. The bottom surfaces of the remaining or intermediate seats are cylindrical and the inner surfaces of all of the rings are cylindrical.

The carcass employed in the present invention must have such a shape that, when assembled on the rim in an inflated condition and without the tread rings, its diameter at the bottom of the seats is greater than the inner diameter of the tread rings. Also, it is preferable that the diameter at the bottom of these seats, when the casing is deflated, should be greater than the inner diameter of the rings; this condition will allow the rings to remain in place at the minimum pressures occurring during the deflation of the tire. Since the rings are provided with internal reinforcement to make them inextensible, they compel the surfaces constituting the bottom of their seats to take a diameter equal to their inner diameter, thus providing a firm connection to the carcass or casing.

In addition, the lateral rings compel the bottoms of their seats to pass from the original conical shape to a cylindrical shape of smaller diameter, also corresponding to that of inner diameter of the tread rings. This radial compression, as exerted by the rings on the carcass, ensures their firm fit even under maximum transversal stresses occurring during the service of the tire.

It is desired that the lateral rings should compress the rubber layer between the lateral seats and the carcass plies of the tire without, however, deforming the tire. For this reason, the inclination of the generatrices of the conical surfaces has a value generally ranging between 2° and 10°.

In order to further improve the connection between the tread rings and the carcass, the tread rings will preferably have a width slightly greater than that of the corresponding seats. This increased width, generally having a value ranging from 5 to 10%, shall be so calculated as to cause the desired lateral forcing of the rings against the ridges between adjacent seats without making the assembling of the rings too difficult.

In order to assist in the placing of the rings into their seats, which maneuver is effected by passing the rings over the ridges at the edges of the seats, it is preferable to chamfer the inner edges of the rings at a radius of about 2 to 5 mm. depending upon the width of the rings and the height of the ridges.

Therefore, it is a principal object of the present invention to provide a pneumatic tire of the type described above including a plurality of separate tread rings which are received in suitable grooves in the tire carcass, wherein the lateral grooves are provided with conical surfaces whose diameters increase towards the side wall of the tire.

It is a further object of the present invention to provide a tire of the type described above where the diameter of the tire at the bottom of the seats, when the tire is devoid of the rings, either in an inflated or deflated condition, is greater than the inner diameter of the rings.

It is a still further object of the present invention to provide a tire of the type described above wherein the width of the rings is slightly greater than the width of the corresponding seats or grooves.

Other and further objects and advantageous features of the present invention will hereinafter more fully appear when considered in connection with a detailed description of the drawings in which.

Figure 1:
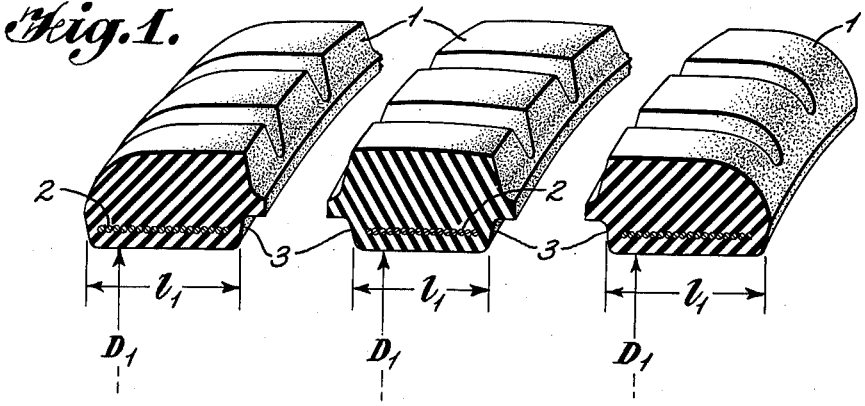
FIGURE 1 is a perspective view, partly in cross section, showing segments of three tread rings which are to be used in accordance with the present invention.

Referring to the drawings in detail, FIGURE 1 shows three tread rings 1 having on their outer surfaces a tread pattern suitable for a given surface condition. The inner surfaces of these rings constitute a cylindrical surface having a diameter $D_1$. Each of the tread rings 1 has a lower or inner reduced portion which corresponds to the part of the ring which is to be encased in the corresponding seat of the casing; the width of each of the last mentioned portions is designated by the reference character $l_1$. Each of the rings is provided with resistance elements 2 adjacent the inner surface of the rings and parallel to this surface; these resistance elements, as set forth above, are made of cords of substantially inextensible material disposed longitudinally or inclined with respect to the mid-circumferential plane of the tire at symmetrical angles not greater than 20°. The inner edges 3 of the rings 1 are suitably chamfered to facilitate the assembling of the rings in the seats on the outer surface of the casing, as will hereinafter appear.

Figure 2:
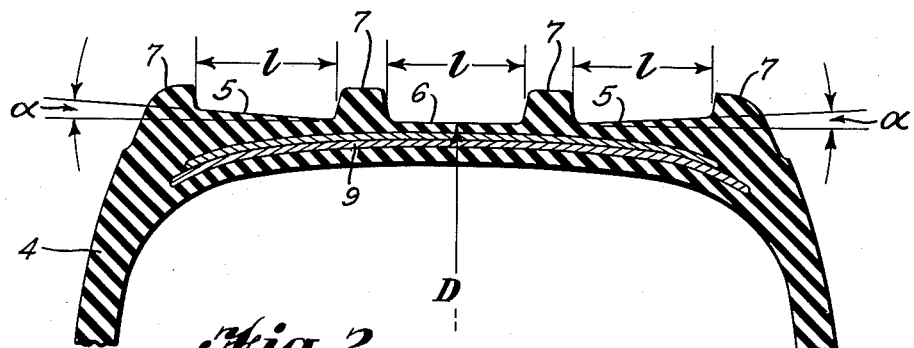
FIGURE 2 is a diagrammatic section of the casing or carcass which is adapted to receive the three tread rings show in FIGURE 1.

Referring now to FIGURE 2, the casing or carcass 4 is provided with two lateral outer seats 5 and a central seat 6. The central seat 6 has its bottom constituted by a cylindrical surface of a diameter D which is greater than inner diameter $D_1$ of the rings 1. The lateral seats have their bottoms constituted by conical surfaces of a diameter increasing from a value D, at their innermost limits, outwardly towards the sidewalls of the tire. The width $l$ of the seats 5 and 6 is smaller than the width $l_1$ of the rings 1, so as to assist in maintaining the rings in their respective seats.

The generatrices of the conical surfaces of the seats 5 are inclined, with respect to the cylindrical surface of the seat 6, at an angle $\alpha$ of about 6°. For the sake of simplicity, the details of the casing 4 are not shown; however, it should be understood that this is a radial carcass. A conventional breaker is designated by the reference numeral 9, and this breaker should be considered as consisting of two layers of sheer cords inclined with respect to the midcircumferential plane of the tire at symmetrical angles of about 52°.

Figure 3:
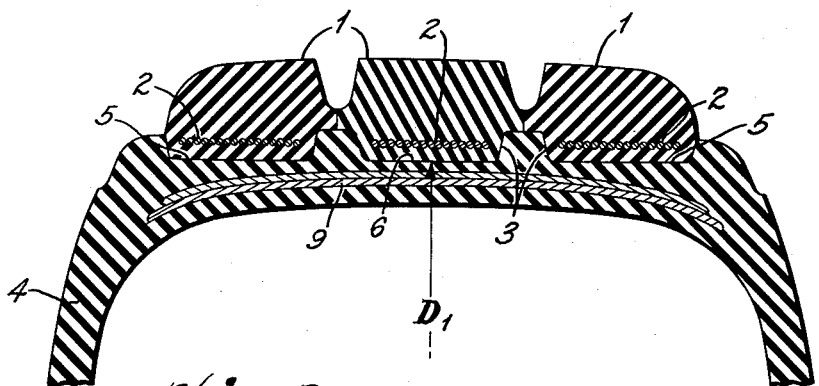
FIGURE 3 is a diagrammatic section showing the rings of FIGURE 1 and the casing of FIGURE 2 as they are employed together in accordance with the present invention.

When the rings are assembled on the casing 4, as shown in FIGURE 3, the inextensible nature of these rings, as provided by the resistance elements 2, will oppose the expansion of the casing when the tire is inflated. Thus, the cylindrical shape of the seat 6 is reduced to a smaller cylindrical shape having a diameter $D_1$. Also, the lateral rings exert a compression on the rubber layer beneath the seats 5 so as to force the bottoms of the seats 5 to change from their original conical shape to a cylindrical shape having a diameter $D_1$ corresponding to the inner-surfaces of the rings.

Whereas the present invention has been described in particular relation to the drawings attached hereto, it should be understood that other and further modifications may be made within the spirit and scope of this invention.

What is claimed is:

1. In a pneumatic tire having a radial carcass and a separate tread mounted thereon, said tread being composed of a plurality of tread rings provided with resistance elements arranged adjacent their inner surfaces and parallel to the latter, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings, the bottom surfaces of the laterally outermost grooves being constituted by conical surfaces whose axes are coincident with the axis of rotation of the tire and whose diameters increase progressively towards the sidewalls of the tire carcass.

2. In a pneumatic tire having a radial carcass and a separate tread mounted thereon, said tread being composed of a plurality of tread rings provided with resistance elements arranged adjacent their inner surfaces and parallel to said surfaces, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings, and a breaker strip comprising two layers of cords inclined with respect to the mid-circumferential plane of the tire at symmetrical angles ranging between 35° and 60° and arranged below the bottoms of said grooves, the bottom surfaces of the laterally outermost grooves being constituted by conical surfaces whose axes are coincident with the axis of rotation of the tire and whose diameters increase progressively towards the sidewalls of the tire carcass.

3. In a pneumatic tire having a radial carcass and a separate tread mounted thereon, said tread being composed of a plurality of tread rings provided with resistance elements arranged adjacent their inner surfaces and parallel to the latter, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings, the bottom surfaces of the laterally outermost grooves being constituted by conical surfaces whose axes are coincident with the axis of rotation of the tire and whose diameters increase progressively towards the sidewalls of the tire carcass and defined by generatrices inclined at an angle ranging from 2° to 10° with respect to the axis of rotation of the tire.

4. In a pneumatic tire having a radial carcass and a separate tread mounted thereon, said tread being composed of a plurality of tread rings provided with resistance elements arranged adjacent their inner surfaces and parallel to the latter, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings, and a breaker strip comprising two layers of cords inclined with respect to the mid-circumferential plane of the tire at symmetrical angles ranging between 35° and 60° and arranged below the bottoms of said grooves, the bottom surfaces of the laterally outermost grooves being constituted by conical surfaces whose axes are coincident with the axis of rotation of the tire and whose diameters increase progressively towards the sidewalls of the tire carcass and defined by generatrices inclined at an angle ranging from 2° to 10° with respect to the axis of rotation of the tire.

5. In a pneumatic tire having a radial carcass and a separate tread mounted thereon, said tread being composed of a plurality of tread rings provided with resistance elements arranged adjacent their inner surfaces and parallel to the latter, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings, the bottom surfaces of the laterally outermost grooves being constituted by conical surfaces whose axes are coincident with the axis of rotation of the tire and whose diameters increase progressively towards the sidewalls of the tire carcass and defined by generatrices inclined at an angle ranging from 2° to 10° with respect to the axis of rotation of the tire, the diameters of the bottom surfaces of all the grooves, when the tire is deflated, being at each point greater than the diameter of the inner surfaces of said tread rings.

6. In a pneumatic tire having a radial carcass and a separate tread mounted thereon, said tread being composed of a plurality of tread rings provided with resistance elements arranged adjacent their inner surfaces and parallel to the latter, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings and a breaker strip comprising two layers of cords inclined with respect to the mid-circumferential plane of the tire at symmetrical angles ranging between 35° and 60° and arranged below the bottoms of said grooves, the bottom surfaces of the laterally outermost grooves being constituted by conical surfaces whose axes are coincident with the axis of rotation of the tire and whose diameters increase progressively towards the sidewalls of the tire carcass and defined by generatrices inclined at an angle ranging from 2° to 10° with respect to the axis of rotation of the tire, the diameters of the bottom surfaces of all the grooves, when the tire is deflated, being at each point greater than the diameter of the inner surfaces of said tread rings.

7. In a pneumatic tire having a radial carcass and a separate tread mounted thereon, said tread being composed of a plurality of tread rings provided with resistance elements arranged adjacent their inner surfaces and parallel to the latter, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings, the bottom surfaces of the laterally outermost grooves being constituted by conical surfaces whose axes are coincident with the axis of rotation of the tire and whose diameters increase progressively towards the sidewalls of the tire carcass and defined by generatrices inclined at an angle ranging from 2° to 10° with respect to the axis of rotation of the tire, the diameters of the bottom surfaces of all the grooves, when the tire is deflated, being at each point greater than the diameter of the inner surfaces of said tread rings, the tread ring portions received within said annular circumferential grooves in the carcass being of a width greater than that of the corresponding grooves receiving said tread rings.

8. In a pneumatic tire having a radial carcass and a separate tread mounted thereon, said tread being composed of a plurality of tread rings provided with resistance elements arranged adjacent their inner surfaces and parallel to the latter, said inner surfaces of said tread rings being of equal and constant diameters such that all points on the inner surfaces of all of said tread rings are at the same distance from the axis of rotation of the tire, said carcass having a plurality of annular peripheral grooves for receiving said tread rings and a breaker strip comprising two layers of cords inclined with respect to the mid-circumferential plane of the tire at symmetrical angles ranging between 35° and 60° and arranged below the bottoms of said grooves, the bottom surfaces of the laterally outermost grooves being constituted by conical surfaces whose axes are coincident with the axis of rotation of the tire and whose diameters increase progressively towards the sidewalls of the tire carcass and defined by generatrices inclined at an angle ranging from 2° to 10° with respect to the axis of rotation of the tire, the diameters of the bottom surfaces of all the grooves, when the tire is deflated, being at each point greater than the diameter of the inner surfaces of said tread rings, the tread ring portions arranged within said annular circumferential grooves in the carcass being of a width greater than that of said grooves.

References Cited in the file of this patent

UNITED STATES PATENTS

| | | |
|---|---|---|
| 1,255,654 | Smith | Feb. 5, 1918 |
| 2,254,329 | Stephens | Sept. 2, 1941 |
| 2,786,507 | Howe et al. | Mar. 26, 1957 |
| 2,874,742 | Lugli | Feb. 24, 1959 |

FOREIGN PATENTS

| | | |
|---|---|---|
| 1,158,208 | France | Jan. 20, 1958 |